(12) United States Patent
Sullivan et al.

(10) Patent No.: US 6,435,464 B1
(45) Date of Patent: Aug. 20, 2002

(54) DEVICE FOR INSTALLING CEILING DISPLAYS

(76) Inventors: Eric A. Sullivan, 2497 Starling Dr., Paso Robles, CA (US) 93446; Cyril B. Schneider, 293 S. Halcyon Rd. Apt. A, Arroyo Grande, CA (US) 93420

( * ) Notice: Subject to any disclaimer, the term of this patent is extended or adjusted under 35 U.S.C. 154(b) by 0 days.

(21) Appl. No.: 09/540,627

(22) Filed: Mar. 31, 2000

(51) Int. Cl.[7] .......................... A47G 29/00; B42F 13/00
(52) U.S. Cl. ..................... 248/340; 248/206.5; 248/683
(58) Field of Search ................. 248/340, 317, 248/322, 339, 206.5, 215, 683

(56) References Cited

U.S. PATENT DOCUMENTS

| | | | | |
|---|---|---|---|---|
| 4,118,000 A | * | 10/1978 | Campbell | 248/228.1 |
| 4,207,697 A | * | 6/1980 | Murphy | 40/600 |
| 4,497,412 A | * | 2/1985 | Labelle | 211/60.1 |
| 5,188,332 A | * | 2/1993 | Callas | 248/544 |
| 5,381,991 A | * | 1/1995 | Stocker | 248/206.5 |
| 5,499,789 A | * | 3/1996 | Rose | 248/489 |
| 5,560,480 A | * | 10/1996 | Singeleton | 206/373 |
| 5,806,823 A | * | 9/1998 | Callas | 248/230 |
| 5,938,255 A | * | 8/1999 | Rose et al. | 294/19.1 |

FOREIGN PATENT DOCUMENTS

CH            684810 A5  *  12/1994

* cited by examiner

*Primary Examiner*—Anita King
(74) *Attorney, Agent, or Firm*—Lyon & Lyon LLP

(57) ABSTRACT

An improved device for placing and removing ceiling displays. The device includes an installation head with one or more seats that house ferromagnetic metal snap rings or a ferromagnetic material insert capable of attaching to magnetic mounting elements able to support a ceiling display from the metal components of an acoustical ceiling or the like. Furthermore, in conjunction with a handle extending from the head, multiple magnetic elements can be suspended from an elevated ceiling. Multiple seats allow receipt of a ceiling display of substantial width with multiple magnetic mounting elements. Consequently, the system allows for convenient and efficient placement and removal of ceiling displays in an efficient, safe, and convenient manner.

12 Claims, 5 Drawing Sheets

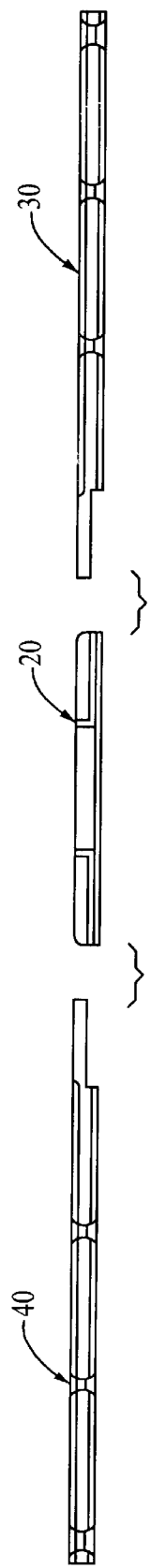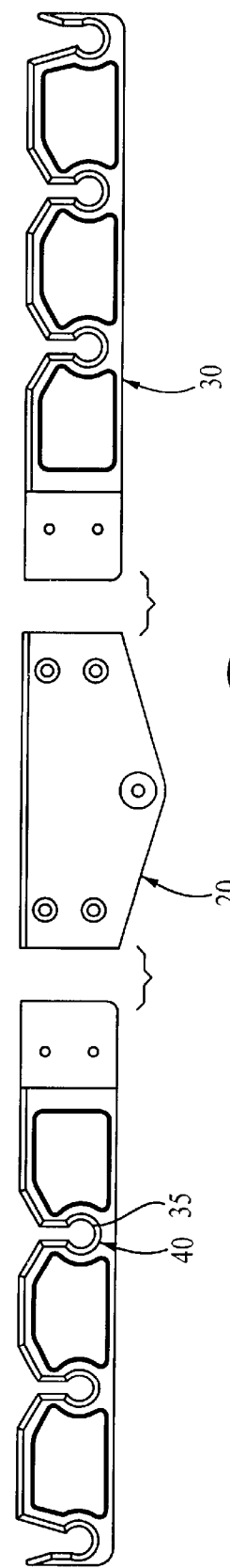

DEVICE FOR INSTALLING CEILING DISPLAYS

BACKGROUND OF THE INVENTION

The field of the present invention is devices for placing and removing ceiling displays.

Typically, devices in this field have been cumbersome and inefficient, requiring ladders, more than one person or complicated mechanisms relying on clips or twists on the acoustical ceiling T-bar, often resulting in inconvenience for users and customers alike, as well as potential ceiling damage.

Some advances in the art include the use of magnets, as shown in U.S. Pat. No. 5,188,332, Callas. This involves a complicated wire release system and uses a magnetic assembly that attaches to the ceiling, allowing one or more hooks to mount and slide on the assembly. However, the magnetic assembly is cumbersome in size and the sign hanging from it must be aligned, i.e. parallel, with the ceiling support frame, where the magnet would not be able to hold the sign if placed at an angle. In addition, the system doesn't permit installation or removal of more than one item at one time.

Another device, U.S. Pat. No. 5,938,255, Rose et al., relies in a ceiling rail which may be anchored by a twisting action of an installation tool, which permits the support and lifting of a planar sign member to attach it to a ceiling support rail, all without the use of magnets. This system also consists of cumbersome apparatus, limited in the type of displays that may be used, and provides for a tedious system requiring engagement or disengagement of one anchor or end at a time.

SUMMARY OF THE INVENTION

The present invention is directed to devices for placing and removing ceiling displays. The device includes an installation head with one or more seats each having a shoulder in the seat which extends through the head. Each seat is open about a portion of its periphery through the edge of the installation head. The seats can accommodate magnetic mounting elements able to support a ceiling display from the metal components of an acoustical ceiling or the like.

In a first separate aspect of the present invention, the seat or seats of the device have a ferromagnetic insert fixed at each seat. This insert can retain a magnetic mounting element until placement is achieved.

In a second separate aspect of the present invention, the device includes multiple seats spaced one from the other to allow receipt of a ceiling display of substantial width with multiple magnetic mounting elements.

In a third separate aspect of the present invention, the device includes multiple spaced seats with shoulders facing from the head in one direction and a handle extending from the head in the other. Thus, multiple magnetic elements can be suspended from an elevated ceiling.

In a fourth separate aspect of the present invention, the device includes magnetic mounting elements positionable in the seat or seats. A multitude of different attachments/ devices or hooks could be fixed to the magnet. The magnetic mounting elements may include a release element spaced from the magnet to be positioned below the head with the magnet in the seat.

In a fifth separate aspect of the present invention, combinations of any of the foregoing separate aspects are also contemplated.

Accordingly, it is an object of the present invention to provide an improved mounting system for ceiling displays. Other and further objects and advantages will appear hereinafter.

BRIEF DESCRIPTION OF THE DRAWINGS

FIG. 3 is an exploded assembly plan view of the side of the mounting base and extensions that form the installation head of FIG. 1.

FIG. 4 is an exploded assembly plan view of the bottom section of the mounting base and extensions that form the installation head of FIG. 1.

DETAILED DESCRIPTION OF THE PREFERRED EMBODIMENTS

Figure 1:
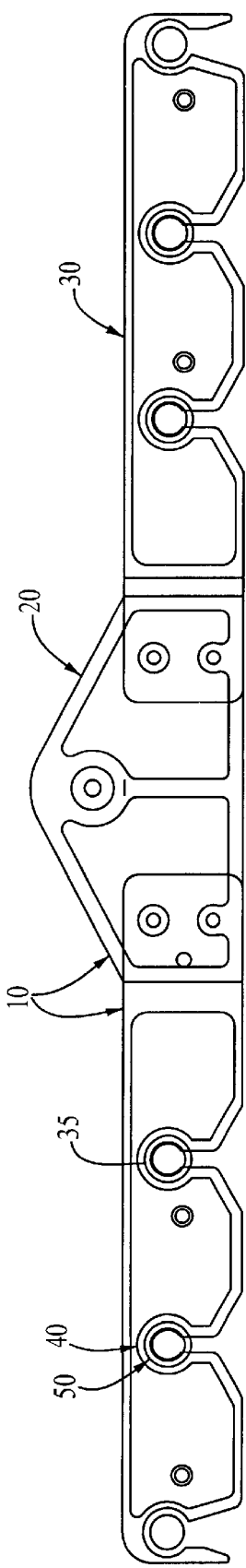
FIG. 1 is a plan view of a six-hole installation head.
Figure 2:
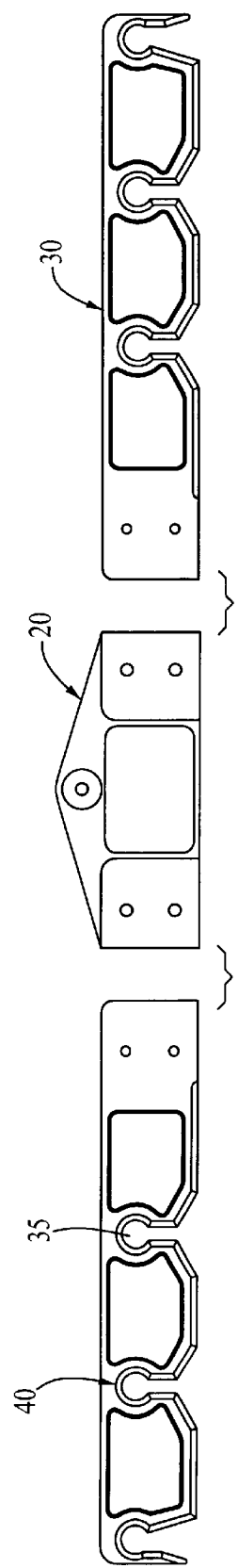
FIG. 2 is an exploded assembly plan view of the top section of the mounting base and extensions that form the installation head of FIG. 1.

Turning in detail to the drawings, a ceiling display installation head is illustrated in two embodiments. Each of the embodiments is for a separate size of installation head. Similar elements are incorporated in each. Consequently, certain reference numbers are repeated where applicable to each embodiment.

An installation head, generally designated 10, may be attached to a handle. The installation head 10, as demonstrated In FIG. 1, consists of two arms 30 attached to a midsection 20. It includes seats 40 extending through the installation head 10 and having a shoulder 35 recessed in the seat. The seats 40 are open about a portion of their periphery through the edge of the installation head 10. The seats are of non-ferromagnetic material.

The installation head in FIG. 1 consists of six recessed seats 40 displaced from one another and extending through the installation head.

Figure 7:
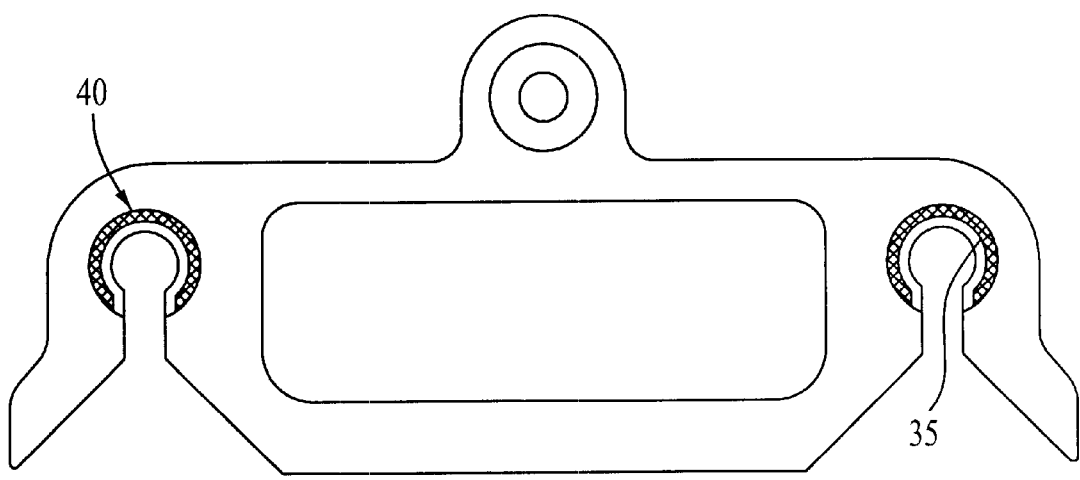
FIG. 7 is a plan view of a two-hole installation head.

Ferromagnetic inserts 50 are located in the seats. These inserts 50 are shown in this embodiment to be snap rings which are placed in the seats 40. These may be held in place by a compression fit. They may abut the shoulders 35. These inserts 50 are sized to exert an attractive force which is less than exerted by a conventional T-bar in an acoustic ceiling or any ferromagnetic material on a magnet placed in one of the seats 40. In this way, a magnetic mounting element positioned in a seat 40 will be retained by the element 50 until lifted to the ceiling where contact is made with a T-bar or any ferromagnetic material. At this point, the magnetic mounting element is retained on the T-bar or any ferromagnetic material. In FIG. 1, six inserts 50 may be employed. In FIG. 7, two inserts are used.

Figure 5A:
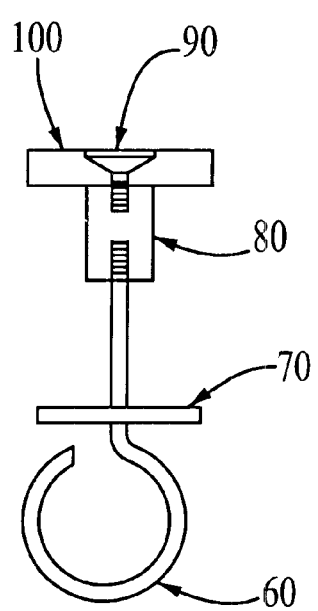
FIG. 5A is a side view of a metal hook.
Figure 5B:
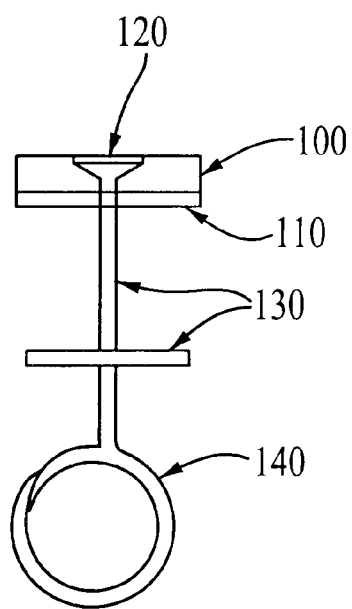
FIG. 5B is a side view of a plastic hook.
Figure 6:
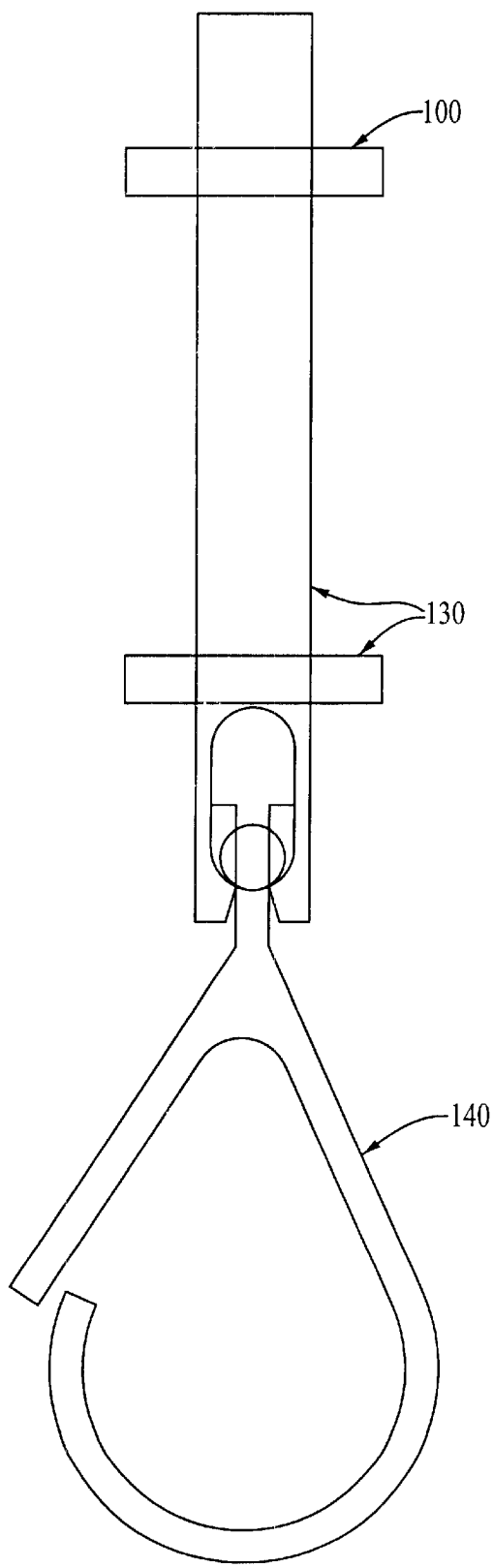
FIG. 6 is a side view of a plastic hook.

The installation head 10 is capable of placing and removing ceiling displays by retaining and releasing magnetic mounting elements. These magnetic mounting elements include hooks such as hook 60 of FIG. 5A and hook 140 of FIG. 5B or any other type or shape of attaching device such as hook 140 of FIG. 6 which is an attachable/detachable plastic piece that can be replaced with other shaped attachments from the installation head 10. The metal hook 60 consists of a threaded shaft, a floating release disc 70, an aluminum connecting barrel 80, a magnet 100, and a holding screw 90. A plastic hook 140 consists of a molded plastic shaft with a release plate 130, a magnet platform 110, a magnet 100, and a melted shaft stub 120. The magnet 100 fits within the recessed seat 40 retained by the shoulder 35, extending beyond the surface of the installation head 10. A hook, such as the hook 60 or the hook 140, fixed to the magnet 100, extends downwardly through the seat 40 when the magnet 100 is retained by the shoulder 35.

Accordingly, an improved device for placing and removing ceiling displays is disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A ceiling display installation device comprising an installation head including at least one seat extending through the installation head and having a shoulder recessed in the seat, the seat being open about a portion of a periphery of the seat through an edge of the installation head;

a ferromagnetic insert fixed at the seat.

2. The ceiling display installation device of claim 1, the ferromagnetic insert being a snap ring compressed in the seat.

3. The ceiling display installation device of claim 1, further comprising a magnet that fits within the seat and is retained by the shoulder, extending outwardly of the installation head;

an attaching device fixed to the magnet, extending downwardly through the seat when the magnet is retained by the shoulder.

4. The ceiling display installation device comprising an installation head including recessed seats displaced from one another and extending through the installation head, each seat having a shoulder recessed in the seat, the seat being open about a portion of a periphery of the seat through an edge of the installation head;

a ferromagnetic insert fixed at the seat.

5. The ceiling display installation device of claim 4, further comprising a magnet that fits within the recessed seat retained by the shoulder, extending outwardly of the installation head;

an attaching device fixed to the magnet, extending downwardly through the seat when the magnet is retained by the shoulder.

6. A ceiling display installation device comprising an installation head including at least one recessed seat extending through the installation head and having a shoulder recessed in the seat facing in a first direction, the seat being open about a portion of a periphery of the seat through an edge of the installation head;

a handle extending from the installation head in a second direction opposite to the first direction.

7. The ceiling display installation device of claim 6, further comprising a ferromagnetic snap ring compressed in the seat.

8. The ceiling display installation device of claim 7, further comprising at least one magnet that fits within the ferromagnetic snap ring recessed in the seat retained by the shoulder, extending outwardly of the installation head;

a hook fixed to each magnet, extending downwardly through the seat when the magnet is retained by the shoulder.

9. A ceiling display installation device comprising an installation head including two recessed seats displaced from one another and extending through the installation head, each seat having a shoulder recessed in the seat, the seat being open about a portion of a periphery of the seat through an edge of the installation head;

a ferromagnetic insert, consisting of a snap ring, fixed at each seat.

10. The ceiling display installation device of claim 9, further comprising a magnet that fits within the recessed seat retained by the shoulder, extending outwardly of the installation head;

a hook fixed to the magnet, extending downwardly through the seat when the magnet is retained by the shoulder.

11. A ceiling display installation device comprising an installation head including six recessed seats displaced from one another and extending through the installation head, each seat having a shoulder recessed in the seat, the seat being open about a portion of a periphery of the seat through an edge of the installation head;

a ferromagnetic insert, consisting of a snap ring, fixed at each seat.

12. The ceiling display installation device of claim 11, further comprising a magnet that fits within the recessed seat retained by the shoulder, extending outwardly of the installation head;

a hook fixed to the magnet, extending downwardly through the seat when the magnet is retained by the shoulder.

* * * * *